June 26, 1956 A. D. STRAHM ET AL 2,752,051
VEHICLE PARKING APPARATUS
Filed Nov. 6, 1952 5 Sheets—Sheet 1
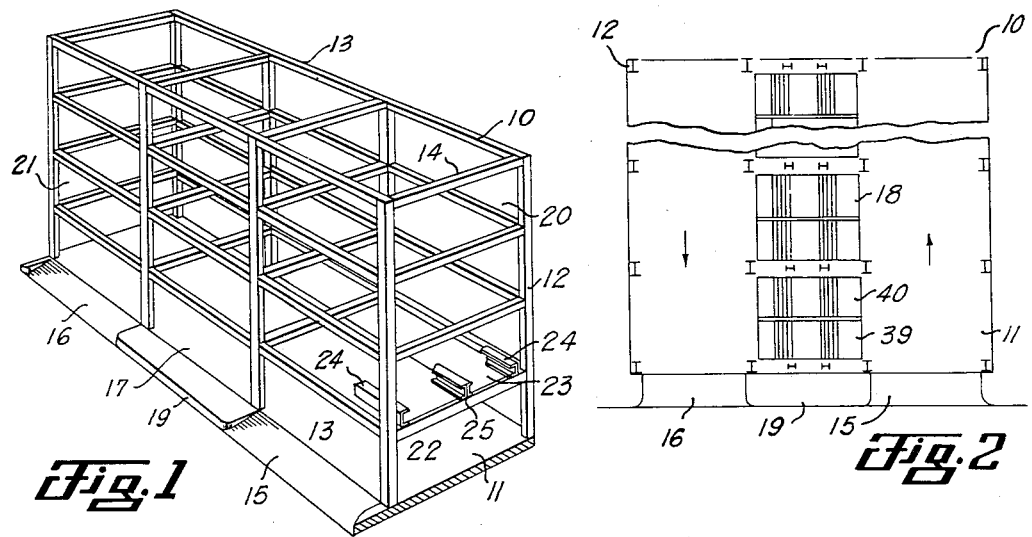
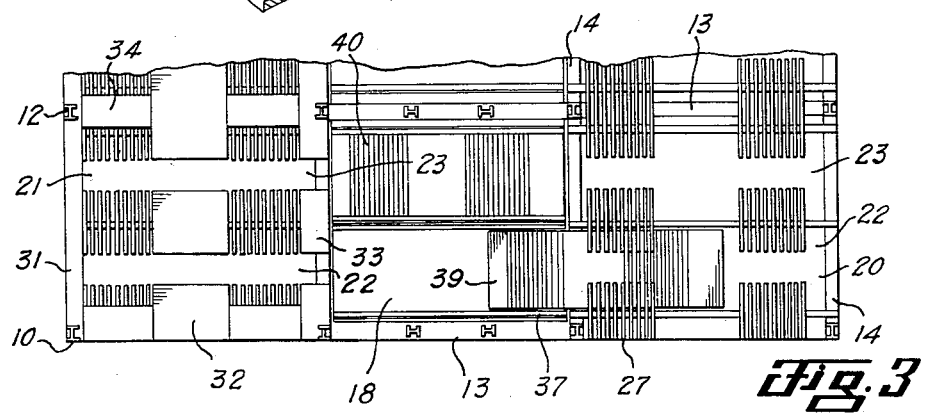
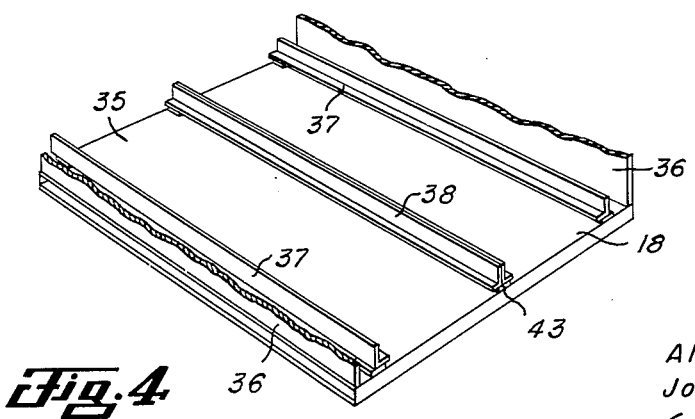
INVENTOR
Allen D. Strahm
Joseph W. Patterson
BY Ashley & Ashley
ATTORNEYS

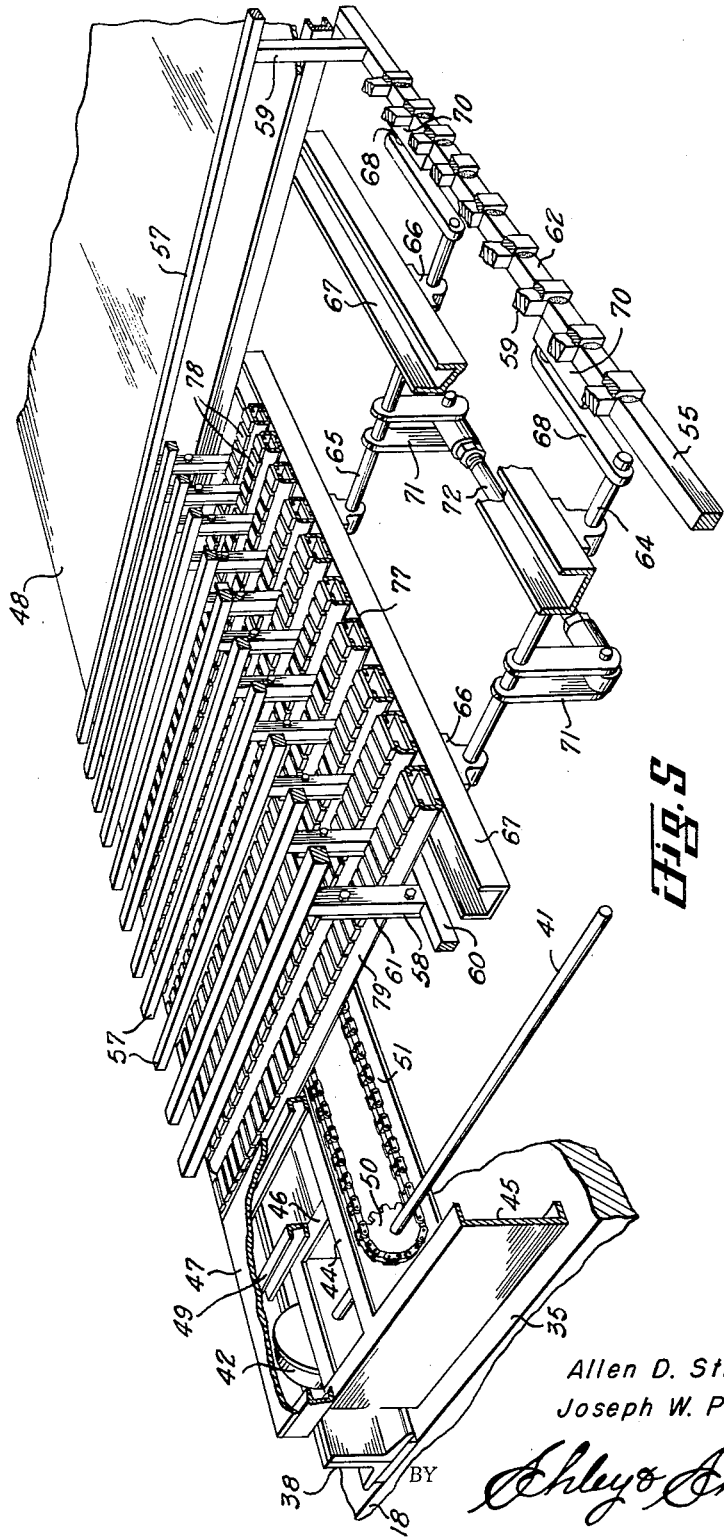

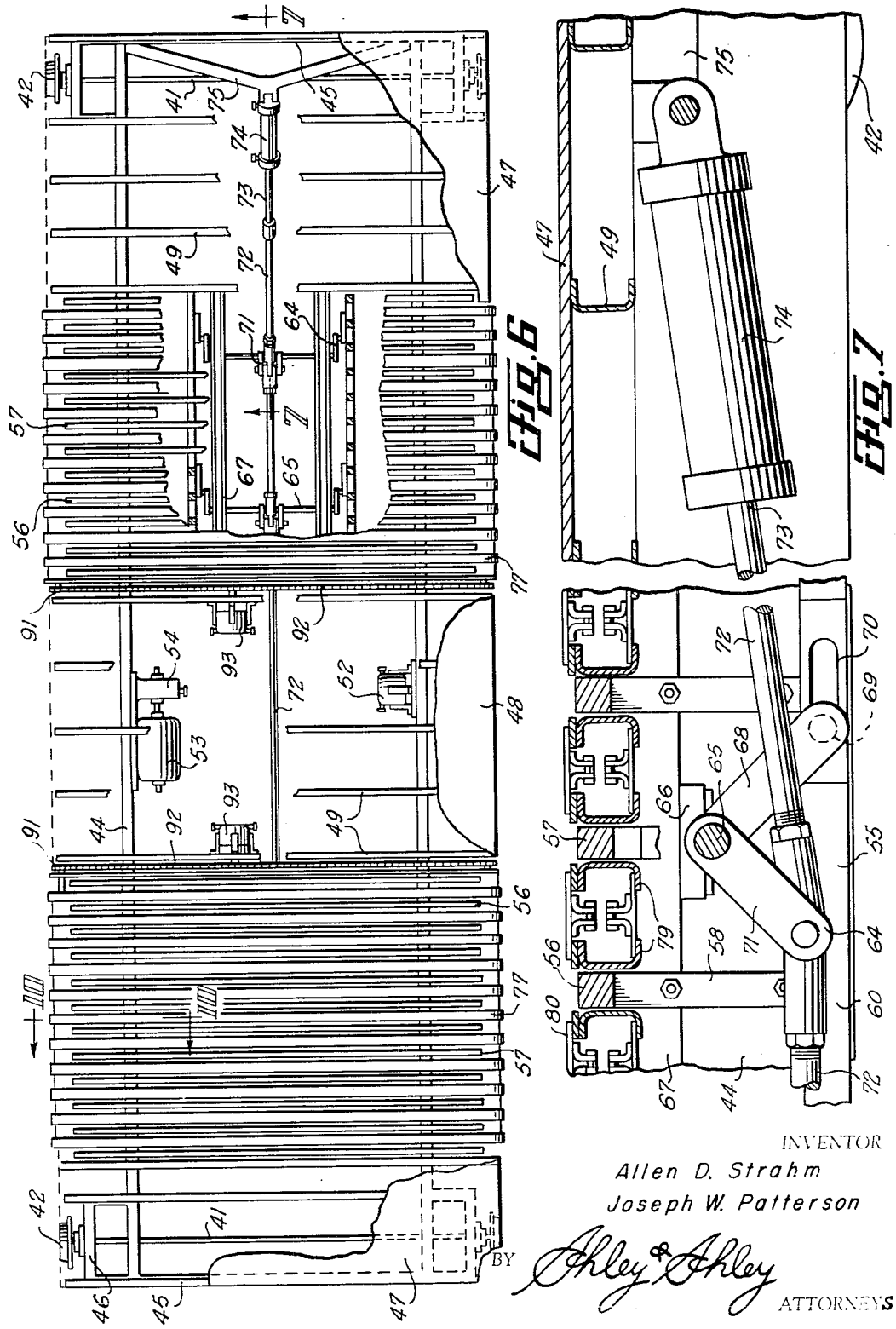

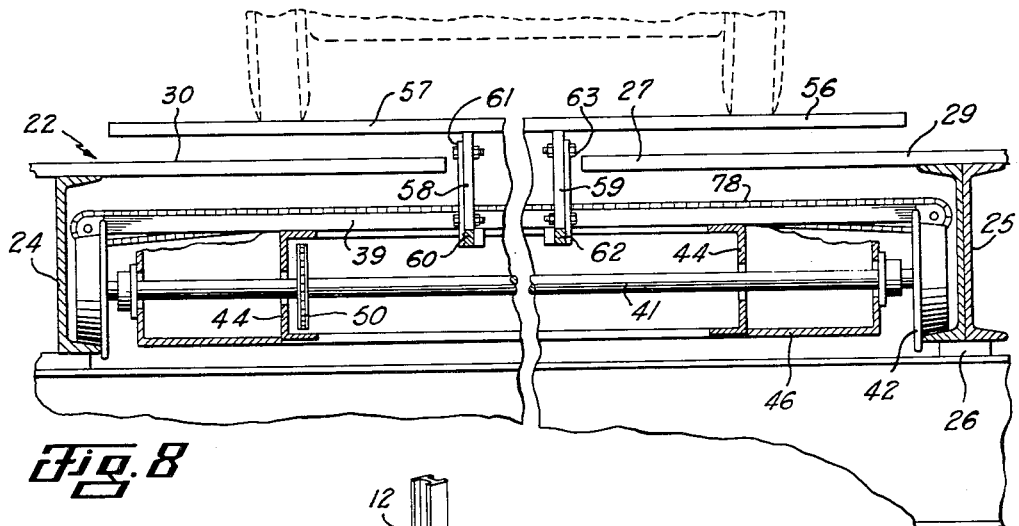
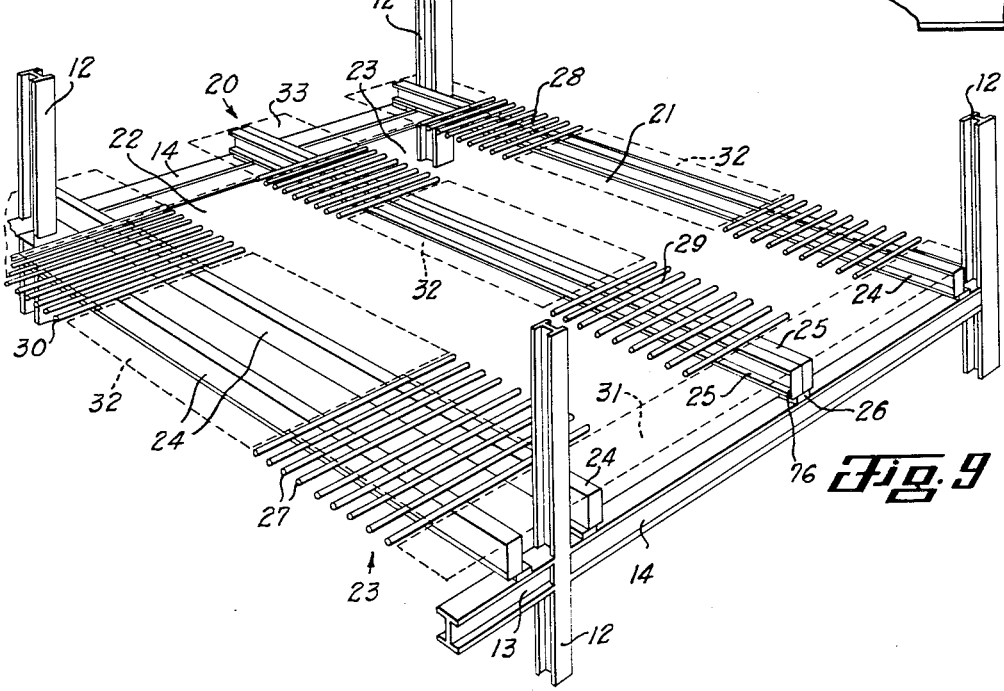

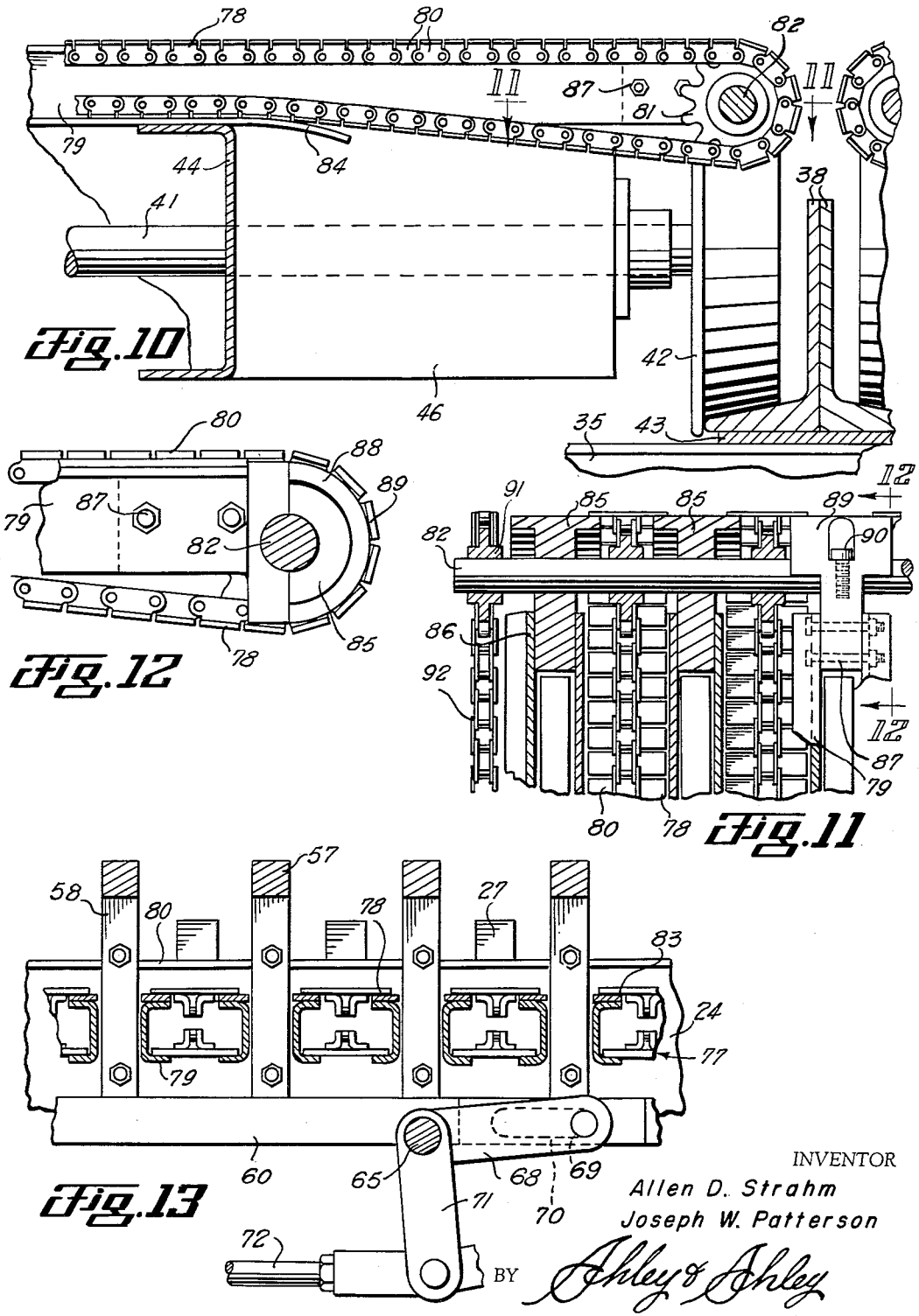

United States Patent Office 2,752,051
Patented June 26, 1956

1

2,752,051

VEHICLE PARKING APPARATUS

Allen D. Strahm and Joseph W. Patterson, Tulsa, Okla.; said Patterson assignor to said Strahm Application November 6, 1952, Serial No. 319,046

14 Claims. (Cl. 214—16.1)

This invention relates to new and useful improvements in the storing of vehicles and more particularly to the parking of automobiles.

One object of the invention is to provide an improved apparatus for parking vehicles wherein the vehicles are moved bodily to and from selected stalls without driving or rolling and without touching any portions of said vehicles except their tires whereby said vehicles may be locked by the owners and abuse or damage to said vehicles by parking attendants is obviated.

Another object of the invention is to provide an improved vehicle parking apparatus of such construction and arrangement that it may have its vehicle entrance and exit in spaced, side-by-side relation whereby the apparatus may be erected on a narrow lot in the middle of a block away from congested intersections and whereby vehicles may readily enter and exit from said apparatus without backing or difficult turning.

A particular object of the invention is to provide an improved apparatus, of the character described, wherein storage stalls are arranged in opposed, spaced pairs with an elevator therebetween for transporting vehicles to and from said stalls, the entrance and exit being below the stall pairs and the elevator having novel means for conveying and removing a vehicle into and from a selected stall.

An important object of the invention is to provide an improved apparatus, of the character described, wherein the elevator is of materially greater width than a vehicle so that there is adequate clearance for driving into and out of said elevator, turning without backing, opening of any or all doors and safe, out-of-traffic getting into and out of the vehicle.

Another important object of the invention is to provide an improved apparatus, of the character described, wherein the elevator has novel means for positioning a vehicle in and out of alinement with any of its opposed stalls irrespective of the initial or desired position of the vehicle whereby no particular skill is required in driving into and out of said elevator and minimum time and effort is expended by the customer.

A further object of the invention is to provide an improved apparatus, of the character described, wherein the elevator includes a pair of carriages alined with and adapted to be moved into and out of the opposed stalls for the positioning and removal of vehicles, each carriage having means for alining a vehicle with its stalls and means for lifting the vehicle to permit its positioning in and removal from either of the opposed stalls whereby the carriage may be returned to the elevator for handling other vehicles.

A construction designed to carry out the invention will be hereinafter described together with other features of the invention.

The invention will be more readily understood from a reading of the following specification and by reference to the accompanying drawings, wherein an example of the invention is shown, and wherein:

2

Fig. 1 is a perspective view of a portion of the frame of a vehicle parking apparatus constructed in accordance with the invention, Fig. 2 is a diagrammatic plan view of the ground floor or entrance and exit level of the apparatus, Fig. 3 is a diagrammatic plan view of a portion of a typical upper floor or storage level of the apparatus with one of the elevator carriages partly in a stall, Fig. 4 is a perspective view of the platform of an elevator with its carriages removed to show its tracks, Fig. 5 is an enlarged perspective view, partly in section, of a portion of the elevator and one of its carriages, Fig. 6 is a top plan view, partly in section, of a carriage, Fig. 7 is an enlarged, vertical, sectional view, taken on the line 7—7 of Fig. 6, showing the relation of the alining and lifting means, Fig. 8 is a transverse, vertical, sectional view of one of the storage stalls with a carriage therein and its lifting means raised, Fig. 9 is a perspective view of a pair of typical storage stalls, with flooring shown in dotted lines, Fig. 10 is an enlarged, vertical, sectional view, taken substantially on the line 10—10 of Fig. 6, showing the mounting of one of the conveyors of the alining means and its relation to the elevator and its other carriage, Fig. 11 is a horizontal, cross-sectional view, taken on the line 11—11 of Fig. 10, Fig. 12 is a vertical, sectional view, taken on the line 12—12 of Fig. 11, and Fig. 13 is a view, similar to Fig. 7, showing the lifting means raised between the grid bars of a stall.

In the drawings, the numeral 10 designates the frame of a structure incorporating the features of the invention and including a foundation or ground floor 11, upright columns 12 and horizontal, longitudinal and transverse girders 13 and 14. The columns and girders are preferably constructed of I-beams as is most clearly shown in Fig. 9. Although not illustrated, the structure may include any type of exterior wall or covering and may be of any desired height. While four floors or levels are shown for purposes of illustration in Fig. 1, it is noted that the provision of twelve to fifteen floors is considered feasible from a standpoint of economy and efficiency. The columns 12 are arranged so that the ground floor 11 is provided with entrance and exit driveways 15 and 16 in spaced, side-by-side, parallel relation and an opening or shaft 17 for an elevator 18 therebetween. In order to facilitate the driving and turning of a vehicle (not shown) into and out of the elevator 18, the width of the driveways 15 and 16 and the length of the elevator opening 17 are greater than the length of the longest automobile and the elevator width is more than twice the width of the widest automobile, the greatest dimension of said elevator extending parallel to the curb 19 of the street into which said driveways open.

Each upper floor or level includes a pair of opposed storage spaces or openings 20 and 21 separated by the elevator shaft or opening 17 and overlying the driveways. As will be explained, the spaces 20 and 21 are serviced by the elevator and each space is adapted to store two automobiles in lengthwise, side-by-side relation. The above described construction provides a unit which includes entrance and exit driveways, an elevator and a plurality of superimposed storage spaces for receiving automobiles from the elevator. As shown in Fig. 2, the complete structure may include any number of units by merely elongating the driveways and by providing additional elevators and storage spaces. Although the driveways may be provided with an additional entrance and exit at the rear of the structure, this is not necessary due to the width of the elevator and driveways which permits turning of the longest automobile without backing. It is pointed out that the arrangement and relation of the driveways and storage spaces to the elevator makes it possible for the structure to be relatively narrow, of variable depth and particularly adapted for erection in the middle of a block away from congested intersections.

As shown in Figs. 1, 3, 8 and 9, a pair of parking or storage stalls 22 and 23 is provided in each of the spaces 20 and 21 by a plurality of longitudinal rails or tracks 24 and 25 extending between and supported by the transverse girders 14. The tracks 24 and 25 are in the form of channels turned edgewise so as to have their webs upright and their flanges horizontal and directed inwardly toward the flanges of an adjacent coacting track. As will be explained, the lower flanges of the track channels are spaced from the girders by suitable blocks 26. The outer track channels 24 are positioned adjacent the columns 12 and the longitudinal girders 13, while the intermediate track channels 25 are disposed midway between said columns with their webs secured back-to-back. Thus, each stall includes a pair of coacting track channels.

A plurality of transverse bars 27 are welded or otherwise fastened to the upper flanges of the track channels in parallel, spaced relation to provide spaced pairs of supporting members or grids 28, 29 and 30 for receiving and supporting automobiles by their tires. Wherever possible, the grid bars 27 are of sufficient length to serve as supports in two stalls. The bars of the grids 29 are supported by the intermediate track channels 25 and extend into the stalls 22 and 23 in spaced relation to the grids 28 and 30. In order to serve the stall 23 of the adjacent space, the bars of the grids 30 are of the greatest length and extend beyond the columns 12 so as to span and be supported by the adjacent outer track channel 24. The bars of the grids 28 are of the shortest length, since the space 21 illustrated in Fig. 9 is at the end or rear of the structure. If desired, suitable flooring 31, 32 and 33 may be provided at the ends of the stalls and between the grid pairs to permit emergency repairs and manual handling of the automobiles. Small floor sections may overlie the intermediate portions of the grids 28 and 30 for the same purpose. In addition to each pair of grids being spaced longitudinally from each other in accordance with the wheel bases or spacing of the front and rear axles of automobiles and smaller trucks, each pair of grids is spaced transversely from the adjacent pair of grids to provide spaces therebetween extending longitudinally of the stalls 22 and 23. Also, the unequal spacing of the axles relative to the ends or bumpers makes it necessary to position the grid pairs closer to one end of the stall than to the other end. Since the grids and flooring are supported by the upper flanges of the track channels, there are no obstructions between the channels of each stall. Although the floor section 31 bridges the space between the track channels, it is noted that the floor sections 32 and 33 have their longitudinal margins terminating flush with the ends of the grid bars.

As shown in Fig. 4, the elevator 18 has a conventional floor or platform 35 and upright side walls 36. Two sets of rails or tracks extend longitudinally of the elevator and are formed by parallel, spaced angle bars 37 and 38, each of which has an upright flange and a lower, horizontal flange secured to the platform 35 and directed inwardly of its track toward the coacting angle bar. The outer angle bars 37 are adjacent the side walls 36, while the intermediate angle bars 38 are secured back-to-back midway between said outer angle bars. A pair of carriages 39 and 40, having transverse axles 41 and flanged wheels 42, are adapted to be supported upon the elevator by the parallel tracks (Figs. 2 and 3) for receiving and supporting automobiles during their transportation to and from the stalls 22 and 23 of the storage spaces 20 and 21. The elevator tracks are of the same width as the stall tracks and the carriages are adapted to be propelled into and out of said stalls with their flanged wheels 42 riding upon the lower horizontal flanges of the angle bars 37 and 38 and channels 24 and 25 (Figs. 5, 8 and 10). Due to the provision of the blocks 26 beneath the channels and similar spacer blocks 43 beneath the lower flanges of the angle bars, sufficient clearance is provided for the flanges of the wheels.

Each carriage has a substantially rectangular frame which includes longitudinal channels or members 44 having their ends connected by transverse channels or members 45 (Figs. 5 and 6). The channels 44 and 45 preferably are turned edgewise with their flanges directed inwardly. Laterally-projecting, outrigger frames or box-like bolsters 46 are carried by the end portions of the longitudinal channels and the axles 41 extend through said end portions and bolsters with their wheels 42 disposed externally of the bolsters. For supporting end floor plates 47 and an intermediate floor plate 48, a plurality of transverse, reduced channel bars 49 overlie and are secured to the frame members including the bolsters 46. In addition to the floor plates overhanging the frame members, the end plates 47 overlie the wheels. A sprocket 50 is fixed on each axle between the flanges of one of the longitudinal channels and an endless chain 51 connects the sprocket to a suitable hydraulic motor 52 supported beneath the intermediate floor plate 48. Although not shown in detail, an electric motor 53 and pump 54 also are mounted beneath the intermediate floor plate for actuating the hydraulic motor 52. Manifestly, the carriages may be driven in either direction by the manipulation of suitable controls (not shown), the carriage 39 being adapted to be propelled into and out of the opposed stalls 22 of the spaces 20 and 21 with the carriage 40 likewise serving the opposed stalls 23.

For raising an automobile, each carriage is provided with an elevating or lifting device 55 which includes a pair of vehicle engaging members or grids 56 positioned between and spaced apart by the floor plates 47 and 48. Since the grids 56 are substantially identical, only one will be described. A plurality of parallel, spaced grid bars 57 extend transversely across the carriage in overlying relation to the longitudinal channels 44 and each grid bar has a pair of spaced, upright arms 58 and 59 depending between said channels. As shown most clearly in Figs. 5 and 8, the lower ends of the arms 58 of each grid are connected to an underlying, longitudinal cross head or rod 60 by suitable straps 61. A similar cross head or rod 62 and straps 63 connect the lower ends of the arms 59, whereby the bars 57 of each grid may be reciprocated vertically as a unit upon similar movement of their cross heads 60 and 62. For imparting reciprocal, vertical movement to the cross heads of each grid, a pair of bell cranks 64 are provided and each bell crank includes a transverse shaft 65 suspended by pillow blocks 66 from a pair of longitudinal channels 67. The latter underlie the grid bars and span the space between the floor plates 47 and 48, being secured to the underside of the channel bars 49 between the cross heads 62. An arm or lever 68 is fixed on each end of each shaft and has a transverse roller 69 at its free end for engagement in a horizontal race 70 in the form of a slotted block secured to each cross head (Figs. 7 and 13). The intermediate portion of each shaft has a pair of clevis arms 71 fixed thereto, at substantially a right angle to the arms 68, for pivotal connection with an underlying drawbar or rod 72 which extends longitudinally of the carriage and which is connected to the piston rod 73 of a hydraulic cylinder 74. An angular brace member 75 extends across one end of the carriage and the cylinder 74 is pivotally suspended therefrom (Figs. 6 and 7). Hydraulic fluid is supplied to the cylinder 74 by the pump 54.

When the bars 57 of the grids 56 are in their lower position as shown in Fig. 7, said grid bars are slightly below the floor plates to permit an automobile to be driven onto either or both carriages. The space between the grids of the lifting device 55 is in accordance with the wheel bases of automobiles and smaller trucks and the space between the ends of the carriage and said grids are unequal due to the relation of said wheel bases to the overall length of automobiles. An automobile supported by its tires resting upon one of the carriages and overlying the grids is adapted to be raised above said carriage by actuation of the lifting device. Upon inward reciprocation of the piston rod 73 and drawbar 72 to the right, the bell crank shafts 65 and arms 68 and 71 of the four bell cranks 64, two being provided for each grid, are pivoted counter-clockwise. Since the shafts are fixed against longitudinal movement by being journaled in the rigid pillow blocks 66 and since the crank arms are fixed on said shafts and relative to each other, the cross heads 60 and 62 and the upright arms 58 and 59 are raised by the pivotal movement of the bell cranks so as to lift the grid bars and the automobile by engagement of said bars with the tires. As shown in Figs. 5, 8 and 13, the lifted grid bars are spaced above the carriage to permit the movement of said carriage into one of the stalls 22 or 23 alined therewith upon positioning of the elevator 18 with its tracks 37 and 38 in alinement with the tracks 24 and 25 of said stalls. Due to their elevation, the grid bars 57 and the automobile supported thereby are above and clear the grid bars 27 upon movement of the carriage into one of the stalls. The inward overhanging and spaced relation of the bars 27 coact with the outward projection of the bars 57 and medial positioning of the upright arms 58 and 59 and cross heads 60 and 62 to provide adequate clearance.

Although not illustrated, the movement of the carriage into the stall is adapted to be stopped when the grids of said carriage are alined with the stall grids whereby their bars register with the spaces between the other bars (Fig. 13). If desired, the ends of the stall tracks may be provided with suitable stops 76 (Fig. 9) to assure stopping of the carriages. In the position shown in Figs. 8 and 13, the grids 56 are adapted to be lowered by clockwise pivoting of the bell cranks 64 and outward reciprocation of the drawbar 72 and piston rod 73 to the left whereby the lifting device 55 is returned to the position shown in Fig. 7. As a result, the automobile is lowered until its tires rest upon the bars 27. Since the bars 57 are now disposed below the bars 27, the carriage may be retracted from the stall back onto the elevator. Thereafter, the elevator and its carriages may be employed to transport another automobile to or from another stall. It is pointed out that the arrangement of the grid bars permits movement of the carriages into and out of the stalls when the grids 56 are either raised or lowered, whereby said carriages are adapted to remove automobiles from said stalls as well as position the same therein. Of course, the described operation is reversed upon removing an automobile from one of the stalls.

The elevator 18 is adapted to accommodate one automobile at a time although it is capable of handling two automobiles simultaneously in emergencies. Due to the elevator being more than twice the width of the widest automobile, adequate clearance is provided to permit easy and unskilled driving into and out of said elevator as well as for getting into and out of an automobile. Irrespective of the initial or desired position, the automobile is adapted to be moved into and out of longitudinal alinement with the stalls 22 and 23 and their tracks 24 and 25. For accomplishing this purpose, each carriage is provided with a pair of alining devices 77 (Figs. 5-8 and 10-13) and the alining devices of the carriages are adapted to coact.

Each alining device includes two groups of endless conveyors 78 extending transversely of the carriage in the spaces between the bars 57 and lifting arms 58 of the grids 56 of the lifting device 55. A pair of channel bars 79 overlie and are secured edgewise to the frame members 44 and channels 67 in each space with their flanges directed inwardly in opposed, spaced alinement. The conveyors 78 preferably are in the form of chains having flat links 80 and pass around sprockets 81 fixed on longitudinal shafts 82 on each side of the carriage. Guide tracks for the upper and lower flights of the conveyor chains are provided by the opposed, coacting flanges of each pair of channel bars 79 and wear plates 83 may be secured to the upper flanges of said channel bars (Figs. 7 and 13). It is noted that the upper flights of the conveyor chains extend above the grid bars 57 and substantially flush with the floor plates. As shown by the numeral 84 in Fig. 10, the ends of the lower channel flanges are cut off and bent downwardly to provide clearance for the conveyor chains in passing around the sprockets 81. A plurality of bearings 85 are carried by the ends of the channel bars for supporting the shafts 82 in substantial alinement with the wheels 42, whereby the sprockets and the end portions of the conveyor chains project beyond said wheels and the longitudinal margins of the carriage. Thus, as shown most clearly in Fig. 10, the contiguous ends of the conveyor chains of the carriages 39 and 40 are in closely spaced relation.

Each bearing 85 includes a T-shaped body 86 clamped between the webs of adjacent channel bars by suitable bolts 87 with the head of the body overlying the ends of said channel bars (Fig. 11). A complementary cap 88, having an arcuate or semi-circular, peripheral flange 89, is fastened to the head of each body 86 by suitable cap screws 90 and the shaft is journaled therebetween. Since the flange 89 of each cap 88 projects laterally of its bearing, semi-circular guides or supports are provided for the end portions of the conveyor chains to eliminate any possibility of binding thereof. A sprocket 91 is fixed on the inner end of each shaft and is connected by an endless chain 92 to a hydraulic motor 93 which is similar to the motor 52 and which is adapted to be actuated by the pump 54 and its electric drive motor 53. The motors 93, one being provided for each group of conveyor chains, are suitably mounted beneath the intermediate floor plate 48 adjacent the other motors and pump.

As set forth hereinbefore, the carriages have the adjacent end portions of the conveyor chains of their alining devices 77 in contiguous or closed spaced relation and said chains are adapted to coact in positioning an automobile in and out of alinement with the stalls 22 and 23. When the carriages are positioned upon the elevators, the groups of conveyor chains of said carriages are in transverse alinement (Fig. 2) and the alined chains are adapted to be driven simultaneously in the same direction at the same rate of speed but independently of the other groups of alined chains. Thus, the right-hand or rear groups of chains may be driven in one direction and the left-hand or front groups of chains in the other direction or all of said chains may be driven in the same direction. Due to this arrangement, an automobile may be moved transversely of the elevator from one carriage to another into and out of alinement with the stalls. Exact alinement is unnecessary, since the elevator tracks 37 and 38 are alined with the stall tracks 24 and 25 upon movement of the elevator to the desired floor or level. The misalinement of the automobile facilitates getting into and out of the same and eliminates the necessity of attendants handling said automobile. Instead, the patron may drive into and out of the elevator without difficulty and without stopping the automobile in any exact position or relation. It is only necessary for the tires to rest upon the conveyor chains of the alining device of either or both carriages.

In operation, an automobile to be parked is driven into the driveway 15 and may be readily turned into one of the elevators 18 without backing due to the width of said driveway and elevator. The plurality of elevators permits the simultaneous handling of a number of automobiles. Since each elevator is adapted to accommodate only one automobile at a time and since the alining devices 77 of the carriages 39 and 40 coact, no skill is required in driving into the elevator and the automobile may be parked or stopped in any position as long as the tires rest upon the conveyor chains 78 of the alining devices. It is contemplated that most automobiles will straddle the carriages in order to permit opening of the doors on both sides. In any event, sufficient room is provided for this purpose and minimum time of the patron is required. Also, since the automobile is driven into as well as out of the elevator by the patron, said automobile is out of the driveways so as to not interfere with the passage of other automobiles and there is no danger of said patron and/or passengers being struck by said other automobiles. In addition, the automobile may be left in gear, with the brakes set and with the ignition and/or doors locked.

It is noted that no attempt has been made to illustrate the controls for the elevators since the same are more or less conventional. It is essential, however, to provide separate controls for each elevator, each carriage, each alining device and each lifting device, said controls preferably being positioned between the elevators in or adjacent one of the driveways. Hydraulic fluid is supplied to the motors 52 and 93 and cylinder 74 by the pump 54 through the usual lines (not shown) for actuating the same to propel the carriages, drive the conveyors and raise and lower the lifting device 55 of each carriage. Of course, suitable electric controls must be provided for starting and stopping as well as for determining the direction of movement.

As has been explained, the automobile is alined with the opposed stalls 22 or 23 of the spaces 20 and 21 by operation of the alining devices and their motors 93. The conveyor chains 78 coact to move the automobile transversely of the elevator so that it is on one of the carriages with its tires resting on the chains of said carriage. In order to aline or straighten the automobile, the front and rear groups of chains may have to be driven at different rates of speeds or in different directions; however, the alined groups of chains of the two carriages are driven at the same rate of speed and in the same direction. Due to the closely spaced relation of the end portions of the alined chains as shown in Fig. 10, the tires of the automobile may ride over the space therebetween without pinching. The supporting of the chain end portions by the bearing flanges 89 eliminates any binding ' ^ to the concentration of weight upon said chain portions. When the automobile is alined, the devices 77 and motors 93 are halted and the motor 52 and lifting device 55 of the carriage supporting said automobile are actuated to raise the grids 56 and their bars 57 which are disposed between the conveyor chains. This lifts the automobile above the chains and upper surface of the carriage for movement into one of the stalls alined therewith upon ascension of the elevator to the desired floor or level. If desired, the lifting device may be actuated during the travel of the elevator. Upon arrival at the desired floor or level, the motor 52 is operated to drive the carriage in either direction desired into one of the opposed stalls in alinement therewith. As has been explained, the grid bars 57 are above the grid bars 27 of the selected stall and there is no obstruction to interfere with the propulsion of the carriage along the tracks 37 and 38 of the elevator onto the alined tracks 24 and 25 of said stall.

Upon halting of the carriage in the stall with its grid bars registering with the spaces between the stall grid bars, the lifting device is actuated to lower its grids below the stall grids whereby the tires of the automobile rest upon said stall grids. The carriage is adapted to be withdrawn from the stall back onto the elevator upon reverse operation of the motor 52. Since the grids 56 are lowered, the carriage is in condition for receiving another automobile from the driveway 15 or another stall. Upon removing an automobile from a selected stall, the elevator is positioned with its rails in alinement with the tracks of the stall and the alined carriage, with its grids lowered, is driven or propelled into said stall. The lifting device is actuated to raise the grid bars 57 above the grid bars 27 and into engagement with the automobile tires, whereby the automobile is withdrawn upon reverse movement of the carriage. It is noted that the positioning of the lifting device between the inner ends of the stall grids permits movement of the carriage into and out of a stall irrespective of whether said device is raised or lowered. When the carriage has returned to the elevator, the latter is lowered to the ground floor or level and the lifting device may be actuated to lower the grids and automobile to rest upon the conveyor chains 78 of the alining devices 77 before, during or after movement of said elevator. As soon as the grids and automobile are lowered, the alining devices may be operated to drive the conveyor chains for misalining said automobile or at an angle relative to said stalls. As has been pointed out, transverse movement of the automobile to the central portion of the elevator, whereby it straddles the carriages, facilitates getting into said automobile as well as turning thereof from said elevator into the driveway 16.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. In a vehicle parking apparatus having a pair of separated storage spaces with a pair of stalls in each space alined with the stalls of the other space, a vehicle carrying platform movable into and out of position between the storage spaces and their stalls, a pair of carriages mounted on the platform for alinement with the stalls and for movement selectively into and out of either alined stall upon movement of said platform into position therebetween, vehicle elevating means mounted on each carriage and including vertically movable tire engaging members for raising and lowering a vehicle to transfer the same to and from a selected stall, and vehicle alining means mounted on each carriage and coacting with each other to move a vehicle transversely of said platform into and out of alinement with a selected stall.

2. The combination set forth in claim 1 wherein each alining means includes transversely movable tire engaging conveyor means.

3. The combination set forth in claim 1 wherein the alining means each carriage includes a pair of transversely movable tire engaging means spaced apart and independently operable for imparting transverse movement to a vehicle by its front and rear tires.

4. In a vehicle parking apparatus having a pair of separated storage spaces and a pair of parallel stalls in each space alined with the stalls of the other space, a vehicle elevator movable into and out of position between the storage spaces and their stalls, a pair of carriages mounted on the elevator for alinement with the stalls and for movement selectively into and out of either alined stall upon movement of said elevator into position therebetween, and vehicle alining means mounted on each carriage and coacting with each other to move a vehicle transversely of said elevator into and out of alinement with a selected stall.

5. The combination set forth in claim 4 including vehicle elevating means mounted on each carriage and comprising vertically movable tire engaging members for raising and lowering a vehicle to transfer the same to and from a selected stall.

6. The combination set forth in claim 5 wherein the tire engaging members are spaced apart substantially in accordance with the longitudinal spacing between the front and rear tires of a vehicle.

7. The combination set forth in claim 4 wherein each alining means includes transversely movable tire engaging conveyor means.

8. The combination set forth in claim 4 wherein the alining means of each carriage includes a pair of transversely movable conveyor means operable independently of each other for imparting transverse movement to a vehicle in either direction.

9. A vehicle parking apparatus including, a plurality of superimposed storage stalls arranged in horizontally alined separated pairs, vehicle supporting means in each stall including a plurality of spaced members, a vehicle elevator movable selectively into and out of position between each pair of alined stalls, a carriage mounted on the elevator for movement selectively into and out of either of each pair of alined stalls below the spaced members of its vehicle supporting means, vertically movable tire engaging members mounted on the carriage for raising a vehicle by its tires above said carriage, the tire engaging members being movable vertically between said spaced members to transfer a vehicle to and from a selected stall, and vehicle alining means mounted on said carriage for movement transversely thereof to move a vehicle into and out of alinement with said carriage.

10. A vehicle parking apparatus including, a plurality of superimposed storage spaces arranged in horizontally alined separated pairs, a pair of parallel stalls in each space in longitudinal alinement with the stalls of the alined space, transverse tire engageable supports in each stall, a vehicle elevator, a pair of parallel carriages mounted on the elevator, said elevator being movable into and out of position between the alined pairs of spaces with its carriages in longitudinal alinement with the alined stalls, each carriage being movable into and out of either alined stall below its supports, vertically movable tire engaging members extending transversely of each carriage for raising a vehicle by its tires above the carriage, the supports of each stall being spaced to permit vertical movement of the members therebetween for transferring a vehicle to and from a selected stall, and transversely movable conveyor means mounted on each carriage and coacting with each other to move a vehicle by its tires transversely of said elevator and carriages into and out of alinement with a selected stall.

11. A vehicle parking apparatus as set forth in claim 10 wherein the conveyor means of each carriage are arranged in groups operable independently of each other for imparting transverse movement to the ends of the vehicle in the same and opposite directions.

12. As a sub-combination in a vehicle parking apparatus, a vehicle supporting carriage, a pair of spaced vertically movable grids including a plurality of spaced parallel bars extending transversely of the carriage, elevating means including bell cranks for simultaneously lifting the grids to raise the bars into engagement with tires of a vehicle and lift the vehicle above said carriage, a plurality of conveyors mounted on said carriage in a pair of groups between the bars of the grids, the conveyors projecting above said grid bars into engagement with the vehicle tires, and independent drive means for each group of conveyors to move the conveyor groups transversely of said carriage in either direction to aline the vehicle therewith.

13. As a sub-combination in a parking apparatus, a vehicle supporting platform, a pair of parallel carriages mounted on the platform for movement longitudinally thereof, a plurality of parallel spaced conveyors mounted transversely on each carriage in a pair of groups, independent drive means for each conveyor group for imparting transverse movement thereto in either direction, the conveyor groups of the carriages being aligned and coacting to move a vehicle transversely of said carriages and platform into and out of alinement therewith, a plurality of vertically movable grid bars mounted on each carriage between the conveyors of each group, and elevating means having connection with the grid bars for raising said bars above said conveyors into engagement with tires of the vehicle to lift the vehicle above the carriage.

14. As a sub-combination in a parking apparatus, a vehicle supporting platform, a pair of parallel carriages carried by the platform, transversely movable conveyors mounted on each carriage in a pair of groups for engagement by the front and rear tires of a vehicle, and independent drive means for each conveyor group of each carriage for imparting transverse movement to the conveyors and to the ends of a vehicle in either direction, the conveyor groups of one carriage being alined and coacting with the conveyor groups of the other carriage whereby a vehicle may be moved transversely of said platform from one carriage to the other and into and out of parallel relation to either carriage.

References Cited in the file of this patent

UNITED STATES PATENTS

| | | |
|---|---|---|
| 635,300 | Condict | Oct. 24, 1899 |
| 1,511,401 | Davis | Oct. 14, 1924 |
| 1,937,189 | Buettell et al. | Nov. 28, 1933 |
| 1,955,959 | Harnischfeger et al. | Apr. 24, 1934 |
| 1,966,165 | Clyde | July 10, 1934 |
| 2,014,351 | Becker | Sept. 10, 1935 |
| 2,058,729 | Sekulski | Oct. 27, 1936 |
| 2,244,524 | Lima | June 3, 1941 |
| 2,467,354 | Baldwin | Apr. 12, 1949 |
| 2,521,727 | Kappen | Sept. 12, 1950 |
| 2,647,647 | Alimanestiano | Aug. 4, 1953 |

FOREIGN PATENTS

| | | |
|---|---|---|
| 236,430 | Germany | July 5, 1911 |
| 337,726 | Great Britain | Oct. 28, 1930 |
| 502,984 | Great Britain | Mar. 29, 1939 |
| 281,626 | Switzerland | July 1, 1952 |